United States Patent
Huchet

(10) Patent No.: US 9,446,458 B2
(45) Date of Patent: Sep. 20, 2016

(54) METHOD AND DEVICE FOR MANUFACTURING AN ACOUSTIC ABSORBENT PANEL

(75) Inventor: Gerard Huchet, Autreches (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 502 days.

(21) Appl. No.: 13/817,346

(22) PCT Filed: Sep. 6, 2011

(86) PCT No.: PCT/FR2011/052030
§ 371 (c)(1),
(2), (4) Date: Feb. 15, 2013

(87) PCT Pub. No.: WO2012/035233
PCT Pub. Date: Mar. 22, 2012

(65) Prior Publication Data
US 2013/0142584 A1    Jun. 6, 2013

(30) Foreign Application Priority Data
Sep. 14, 2010 (FR) ..................... 10 57295

(51) Int. Cl.
| | |
|---|---|
| *B23C 3/13* | (2006.01) |
| *E04B 1/86* | (2006.01) |
| *E04B 9/04* | (2006.01) |
| *E04B 1/82* | (2006.01) |
| *E04B 1/84* | (2006.01) |

(52) U.S. Cl.
CPC . *B23C 3/13* (2013.01); *E04B 1/86* (2013.01); *E04B 9/0464* (2013.01); *E04B 2001/8245* (2013.01); *E04B 2001/849* (2013.01); *Y10T 409/303752* (2015.01)

(58) Field of Classification Search
CPC ......... B23C 3/13; E04B 9/0464; E04B 1/86; E04B 2001/849; E04B 2001/8245; Y10T 409/303752; Y10T 409/303976; Y10T 409/304032
See application file for complete search history.

(56) References Cited

U.S. PATENT DOCUMENTS

| | | | | |
|---|---|---|---|---|
| 3,575,027 | A | * | 4/1971 | Eisler .............................. 72/186 |
| 4,615,671 | A | * | 10/1986 | Bernal .......................... 425/289 |
| 6,053,022 | A | * | 4/2000 | Shore ............................. 72/249 |
| 2006/0035775 | A1 | * | 2/2006 | Duncan et al. ................. 483/30 |

FOREIGN PATENT DOCUMENTS

| | | |
|---|---|---|
| CH | 688 777 | 3/1998 |
| DE | 20 2004 016448 | 12/2004 |
| DE | 10 2004 061138 | 7/2005 |
| EP | 1 138 842 | 10/2001 |
| GB | 793015 | * 4/1958 |

OTHER PUBLICATIONS

International Search Report Issued Apr. 23, 2012 in PCT/FR11/52030 Filed Sep. 6, 2011.

* cited by examiner

*Primary Examiner* — David Bryant
*Assistant Examiner* — Steven A Maynard
(74) *Attorney, Agent, or Firm* — Oblon, McClelland, Maier & Neustadt, L.L.P.

(57) ABSTRACT

The invention relates to a method for manufacturing an acoustic absorbent panel, comprising the following steps:
provision of a sheet of plastic material,
formation of a plurality of through-slots in the sheet by milling using at least one milling tool.
The invention makes it possible to manufacture an acoustic absorbent panel quickly and inexpensively.

12 Claims, 2 Drawing Sheets

METHOD AND DEVICE FOR MANUFACTURING AN ACOUSTIC ABSORBENT PANEL

CROSS REFERENCE TO RELATED APPLICATIONS

The present application is a 35 U.S.C. §371 national stage patent application of International patent application PCT/FR2011/052030, filed on Sep. 6, 2011, published as WO 2012/035233 on Mar. 22, 2012, the text of which is incorporated by reference, and claims the benefit of the filing date of French application no. 1057295, filed on Sep. 14, 2010, the text of which is also incorporated by reference.

The invention relates to a method and a device for manufacturing an acoustic absorbent panel, in particular a panel made of plastic provided with a plurality of slots.

Such acoustic absorbent panels are well known and are installed in buildings as partitions or else along a partition or a ceiling, with or without spacing relative to the partition or to the ceiling.

The slots of such a type of acoustic absorbent panel are generally straight, or even oblong or ripple-shaped, with a width typically of between 0.1 and 2 mm.

It is known practice to form such slots by laser etching. However, this technique is very costly and slow to implement.

There is therefore a need for a method for manufacturing an acoustic absorbent panel which is quick and inexpensive.

For this, the invention proposes a method for manufacturing an acoustic absorbent panel, comprising the following steps:
provision of a sheet of plastic material,
formation of a plurality of through-slots in the sheet by milling using at least one milling tool.

According to another particular feature, in the slot formation step, the plurality of slots is formed by milling using a plurality of milling tools.

According to another particular feature, the sheet is made of linear thermoplastic polyester, preferably of polyethylene terephthalate glycol (PETG), or even of polyethylene terephthalate (PET) or of polycarbonate (PC) or of polymethyl methacrylate (PMMA).

According to another particular feature, in the slot formation step, each milling tool is sprayed with water to cool and clean the milling tool.

According to another particular feature, in the slot formation step, the sheet is positioned so that each milling tool is facing a single point on the sheet to form a single slot.

According to another particular feature, in the slot formation step, the sheet is positioned so that each milling tool is facing a first point on the sheet to form a first slot then, once the first slot is formed, the sheet is moved away from the milling tool or tools and repositioned so that each milling tool is facing at least one second point on the sheet so as to form at least one second slot.

According to another particular feature, in the slot formation step, the slots are formed parallel to one another, on one and the same line or staggered.

According to another particular feature, in the slot formation step, a plurality of slots are formed parallel to one direction then a plurality of slots are formed parallel to another direction different from said direction.

According to another particular feature, the method also comprises, before the slot formation step, a step for decorating the sheet with water-resistant ink, paint or varnish then/or a step for coating the sheet with a scratch-proof varnish.

The invention also relates to a device for implementing the method described above for manufacturing an acoustic absorbent panel, comprising:
a means for holding a sheet of plastic material,
at least one shaft held so as to rotate at at least one of its ends, the at least one shaft bearing at least one milling tool suitable for forming, by milling, at least one through-slot in the sheet.

According to another particular feature, the at least one shaft bears a plurality of milling tools, each being designed to form at least one through-slot in the sheet.

According to another particular feature, the at least one shaft is held so as to rotate at both its ends.

According to another particular feature, the device also comprises at least two water jets associated with each milling tool, each of the water jets being designed to spray the milling tool respectively from above and from below.

According to another particular feature, the device also comprises means for translating the means for holding the sheet in a first and a second direction, which are different.

According to another particular feature, the means for translating the means for holding the sheet are designed to translate the means for holding the sheet vertically and horizontally.

According to another particular feature, the means for holding the sheet is a panel to which the sheet is fixed, the panel being provided with a plurality of slots at the corresponding points where slots have to be formed in the sheet.

According to another particular feature, the milling tools borne by two adjacent shafts are arranged in line or staggered.

The invention also relates to a use of the device described above to manufacture an acoustic absorbent panel consisting of a sheet of polyethylene terephthalate glycol or of polyethylene terephthalate or of polycarbonate or of polymethyl methacrylate, provided with a plurality of slots with a width of between 0.2 and 0.4 mm and with a percentage surface area of slots relative to the total surface area of the panel of between 1.5 and 5%.

The invention also relates to an acoustic absorbent panel consisting of a sheet made of polyethylene terephthalate glycol or of polyethylene terephthalate or of polycarbonate or of polymethyl methacrylate, provided with a plurality of slots with a width of between 0.2 and 0.4 mm with a percentage surface area of slots relative to the total surface area of the panel of between 1.5 and 5%.

The invention also relates to a partition or a ceiling or a partition or ceiling element comprising at least one acoustic absorbent panel described above.

Other features and advantages of the invention will now be described in light of the drawings in which.

The reference numbers which are the same in the different figures represent identical or similar elements.

The invention relates to a method for manufacturing an acoustic absorbent panel provided with a plurality of slots. The method comprises a step for provision of a sheet of plastic material. The method also comprises a step for the formation of a plurality of through-slots in the sheet by milling using at least one milling tool.

The milling using at least one milling tool makes the method less expensive, a milling tool being much cheaper than a laser head. Furthermore, the use of a milling tool is simpler than that of a laser head, which makes cuts by following digitized paths, which makes it possible to manufacture the acoustic absorbent panel more quickly.

The invention also relates to a device for manufacturing an acoustic absorbent panel. The device makes it possible to implement the method according to the invention.

Figure 1:
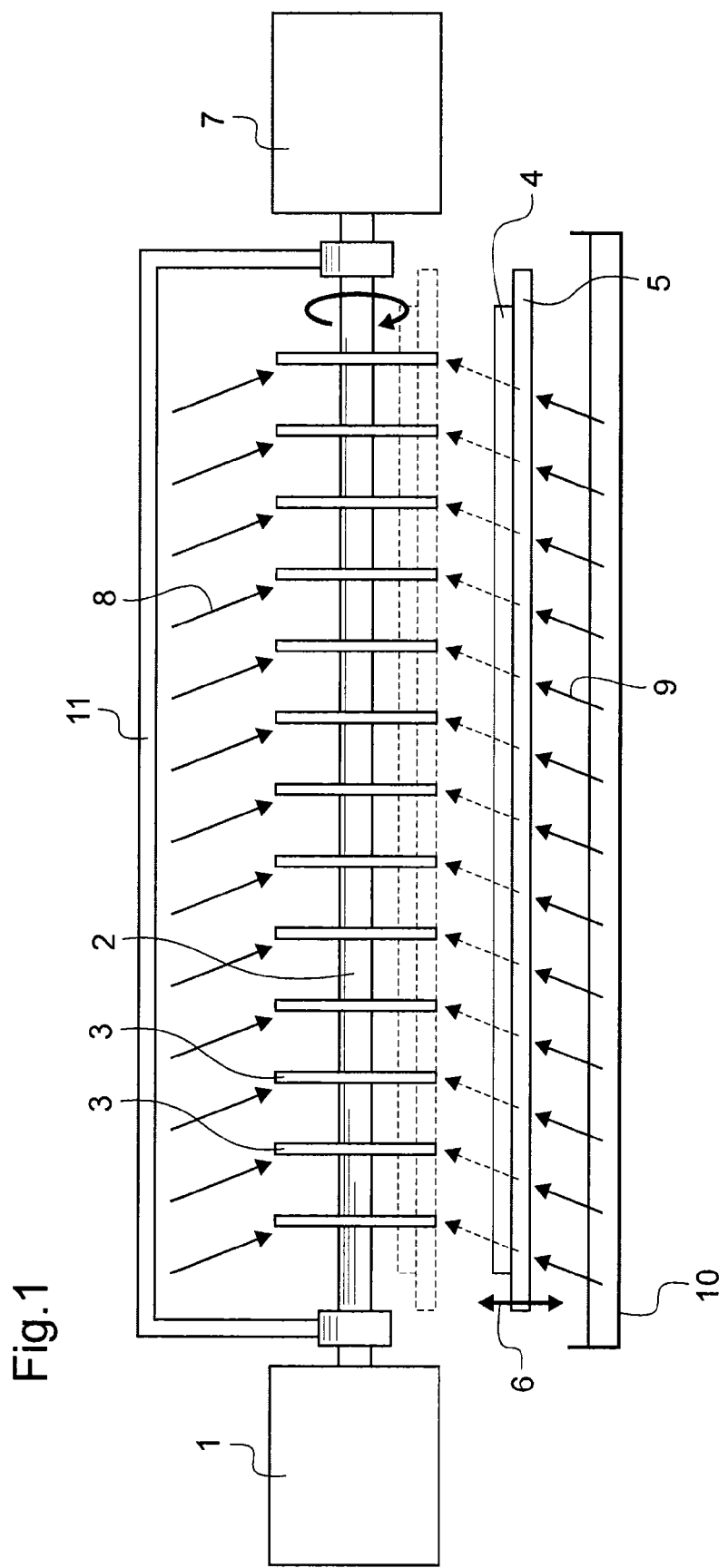
FIG. 1 represents a side view of a device according to the invention.

FIG. 1 represents a side view of a device according to the invention.

The device comprises a module 1 holding at least one shaft 2 which can rotate about its axis and on which is mounted at least one milling tool 3. Each shaft 2 is held so as to rotate at one of its ends on the module 1. The milling tool or tools 3 is/are preferably mounted on each shaft 2 so that the center of the milling tool or tools 3 is on the axis of symmetry of the shaft 2. Thus, when each shaft 2 is rotating about its axis, the module 1 being immobile, the shaft 2 rotationally drives the milling tool or tools 3 situated thereon. The module 1 comprises a motor (not represented) suitable for driving the shaft or shafts 2 in rotation about their axis, with, for example, an electronic motor control system.

A milling tool 3 has substantially the form of a disc provided with teeth. Each milling tool 3 is designed to cut at least one through-slot in a sheet 4 of plastic so as to form an acoustic absorbent panel provided with a plurality of slots. The slots have, for example, a width of between 0.2 and 2 mm, in particular between 0.2 and 0.4 mm. The milling tool 3 should be selected with a thickness corresponding to the desired slot width.

The device also comprises a means 5 for holding a sheet 4 of plastic material (preferably of polyethylene terephthalate glycol, or even of polyethylene terephthalate or of polycarbonate or of polymethyl methacrylate). The holding means 5 holds the sheet 4 so as to prevent it from moving when the milling tool or tools 3 are in the process of forming the slots in the sheet 4. The holding means 5 is preferably a panel, for example made of wood or of plastic material, on which the sheet 4 is placed and held fixed, during the slot formation time, for example by clamps and/or suckers. Hereinafter in the description, the holding means will be called "panel", but that should not be considered to be limiting.

The panel 5 is provided with a plurality of slots preformed at the corresponding points where slots have to be formed in the sheet 4, in order to avoid requiring each milling tool to form a slot both in the sheet 4 and in the panel of the holding means 5. Having a holding means in the form of a panel makes it possible to withstand the forces exerted on the sheet 4 during the milling so that the sheet 4 is not deformed under the effect of said forces.

The sheet 4 is designed to be translated in a first direction (represented in FIG. 1 by the arrow 6), which is the direction perpendicular to the plane of the sheet. Thus, the sheet 4 can be displaced toward the milling tool or tools 3 in order for the milling tool or tools to be able to form slots in the sheet. The sheet can also be moved away from the milling tool or tools 3 when the milling operation is finished.

The sheet 4 is also designed to be translated in a second direction, which is perpendicular to the first direction, and which is parallel to the plane of the sheet 4. This second direction corresponds to the direction in which the slot has to be produced.

The translations of the sheet 4 in the first and second directions are performed, for example, using a table (not represented) supporting the panel 5 and the sheet 4, the table being able to be translated along a first axis parallel to the first direction and on a second axis parallel to the second direction. The translational movements of the table in the first and/or the second direction can be performed either manually, or in a motorized manner, using, for example, an electronic system for controlling the translational movements of the table to produce the acoustic absorbent panel provided with slots.

Preferably, the sheet 4 is held in the horizontal position on the holding means 5. The shaft 2 is then preferably horizontal, with one or more milling tools in a vertical plane. The first direction of translation of the sheet 4 is then vertical and the second direction of translation of the sheet 4 is then horizontal.

The amplitude of translation of the sheet 4 in the first direction must be sufficient both to form a through-slot in the sheet 4 and to be able to place and release the sheet 4 in the device without difficulty. The sheet 4 can be positioned between two extreme positions: a rest position, a position in which the sheet can be withdrawn or placed without difficulties for the user, and a working position (shown in dotted lines in FIG. 1), in which the milling tool or tools pass completely through the sheet 4 to form the slots. In the working position, the milling tool or tools also pass through at least a portion of the slots of the panel 5.

The amplitude of translation of the sheet 4 in the second direction must be adapted to the length of the slots that are to be produced, that is to say, a length of at least 40 mm. In the case where several rows of slots have to be produced in the sheet by the milling tool or tools 3 of a single shaft 2, the amplitude of translation of a sheet 4 in the second direction must be at least the width or the length of a sheet 4, for example 1 m for a 1 $m^2$ square sheet, so as to be able to produce the different rows of slots in a panel with a device according to the invention without having to reposition the sheet 4 differently on the table while milling the sheet 4.

In the present description, the expression "row of slots" is used to mean a series of slots produced by the slots of a single shaft, the milling tools being arranged perpendicularly to the shaft.

Note that in the case where several rows of slots have to be produced in the sheet by a single milling tool 3 of a single shaft 2, the milling tool must be displaced on the shaft 2 between two milling operations for milling two slots of one and the same row.

Each milling tool 3 is designed to form a single slot or else a plurality of slots in the sheet 4. However, the more milling tools there are on the shaft 2, the faster the milling operation becomes, because several slots can be produced simultaneously. Thus, the shaft 2 may bear a single milling tool 3, or else two milling tools 3, or else a plurality of milling tools.

Preferably, the device according to the invention comprises at least two shafts 2, parallel to one another, and even more preferably, a plurality of shafts 2 parallel to one another, so as to increase the speed of production of an acoustic absorbent panel provided with slots. Each shaft 2 bears a single milling tool 3, or else two milling tools 3, or else a plurality of milling tools.

The length of a slot is defined as being the greatest length of the slot over the entire thickness of the slot, and therefore of the sheet. In practice, since the milling tool is disc-shaped, the ends of the slot may not have vertical edges, but curved edges, with the same radius of curvature as the milling tool. The length of the slots is preferably such that the ratio of the surface area of the slots of a sheet to the total surface area of the sheet is between 1.5 and 5%. This represents, for example, for a 1 m² square sheet, 1000 slots 10 cm long and 0.2 mm wide, with 10 mm between two rows of slots and 9.8 mm between two slots of a same row. It is essential to find a good compromise for the length of the slots, so that the mechanical solidity of the panel is not affected. In this case, the device preferably comprises 9 shafts each bearing 99 milling tools if a space of 9.9 mm is left at each end of each row of slots relative to the edge and a space of 0.5 cm is left between the rows of slots closest to the edge and the edge.

The device is designed to produce slots of different lengths on one and the same sheet, in particular when the slots are not all produced at the same time.

Figure 2:
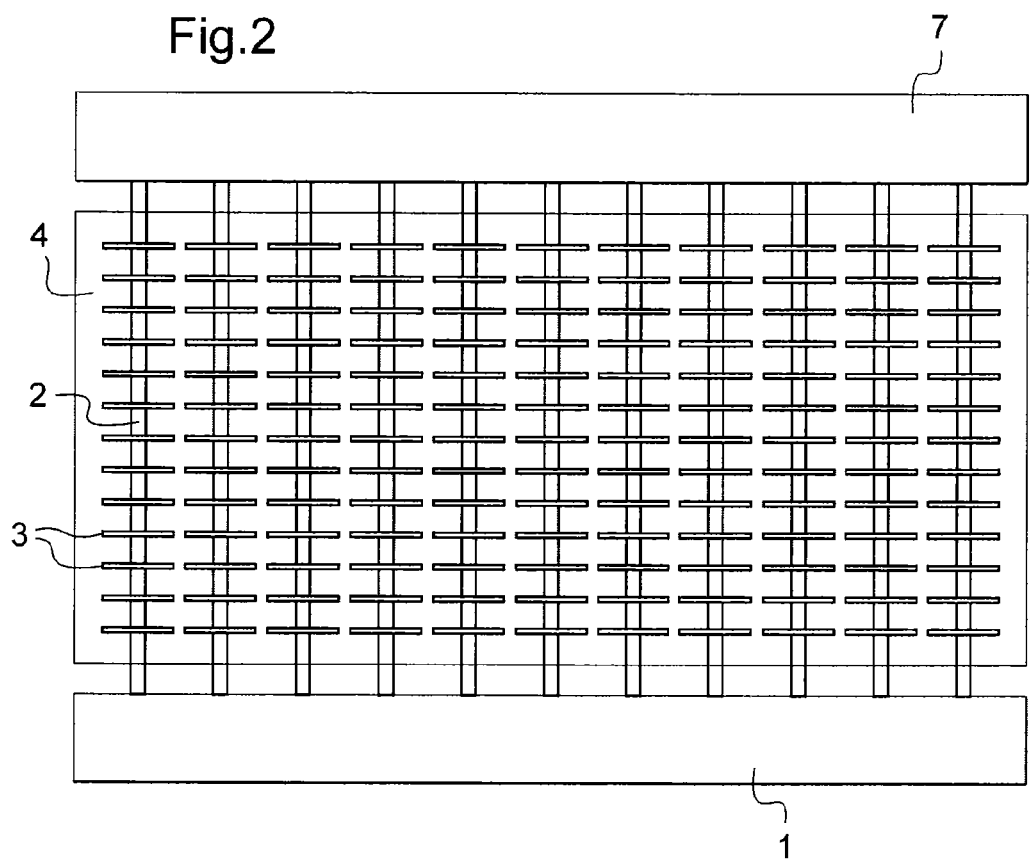
FIGS. 2 and 3 represent a plan view of a device according to the invention, with milling tools respectively aligned and staggered.
Figure 3:
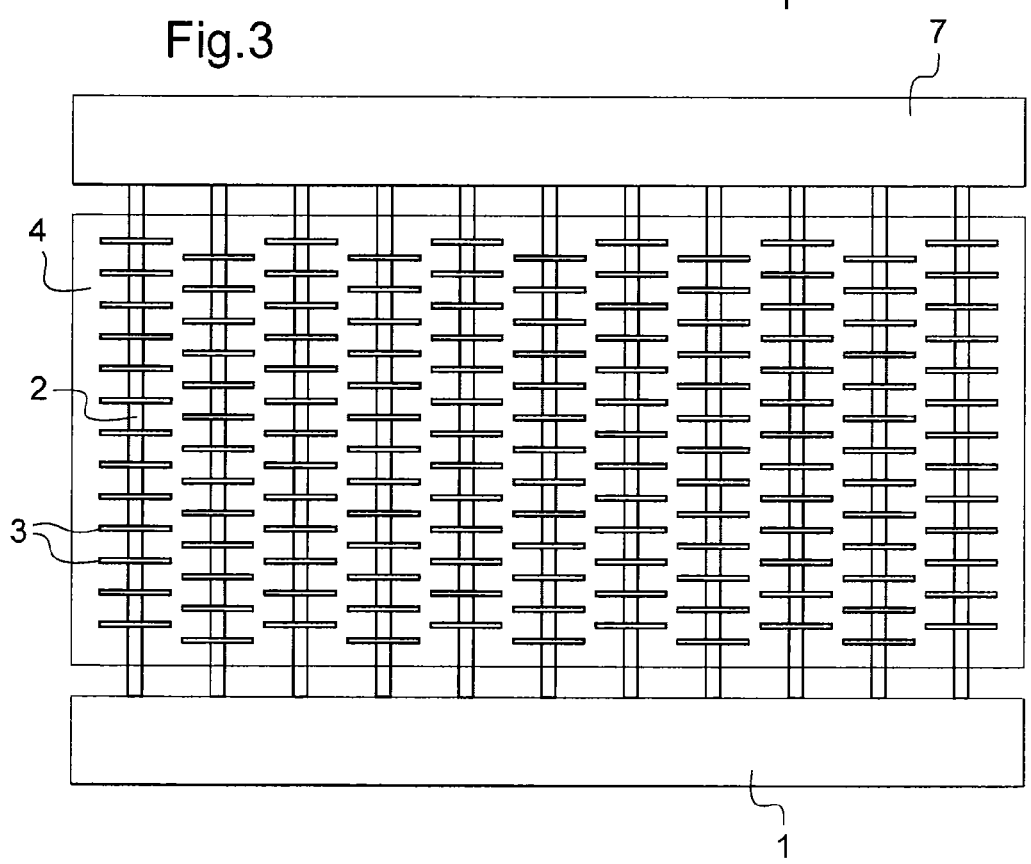

When the device according to the invention comprises at least two shafts, the milling tools borne by two adjacent shafts are arranged aligned, as can be seen in FIG. 2, or else staggered, as can be seen in FIG. 3. Thus, the slots on the acoustic absorbent panel may be aligned or staggered, which makes it possible to adapt the pattern to the wishes of the final user.

The distance between two adjacent shafts 2 is preferably constant over the entire device, so as to have a regular pattern of slots.

The device according to the invention preferably comprises a second module 7 designed to hold the shaft or shafts 2, in such a way as to rotate by bearings, at their end opposite to the end held by the module 1. Holding the shaft or shafts 2 at their two ends makes it possible to avoid having the shaft or shafts positioned out-of-true. This second module is not motorized.

The device also comprises at least one pair of water jets 8, 9, each pair of water jets 8, 9 being designed to spray a single milling tool with a jet of water 8 from above and a jet of water 9 from below. The spraying from below is done, for example, through the slots produced in the panel 5, or directly if the milling tool has passed through the sheet 4 and the panel 5. The device comprises, for example, a tank 10 filled with water, arranged under the means 5 for holding the sheet 4, which serves as a water receptacle for spraying the milling tools. The jets of water 8 for spraying from above come, for example, from holes produced in a pipe 11 situated above the shaft 2. The spraying of the milling tools 3 by the water jets 8 situated above the shaft or shafts 2 makes it possible to prevent the milling tools from overheating, in order not to damage the sheet 4, and the spraying of the milling tools 3 by the water jets 9 situated below the shaft or shafts 2 makes it possible to clean the teeth of the milling tools, which is particularly useful when each milling tool has to produce at least two slots in the same sheet.

As a variant of the embodiment described above, the sheet 4 is immobile and it is the module 1, and, where appropriate, the module 7, which can be translated in vertical and horizontal directions.

The invention also relates to the method for manufacturing an acoustic absorbent panel provided with slots using the device of the invention.

The method comprises a step for provision of a sheet 4 of plastic material. The sheet 4 of plastic material is made of linear thermoplastic polyester, preferably of polyethylene terephthalate glycol (PETG). This material has great mechanical strength and is inexpensive. As a variant, the sheet 4 of plastic material is made of polyethylene terephthalate (PET) or of polycarbonate (PC) or of polymethyl methacrylate (PMMA). The sheet 4 of plastic material may be transparent, which is advantageous for producing, for example, partitions or ceilings that have to be transparent. As a variant, the sheet of plastic material is colored and/or satinized and/or diffusing. The sheet 4 of plastic material preferably has a thickness of between 4 and 5 mm.

The method also comprises a step for formation of a plurality of through-slots in the sheet 4, by milling using at least one milling tool 3.

The speed of rotation, the shape of the teeth, the grinding angle and the cutting angle of the milling tool or tools are specially adapted to the material of the sheet in which the slots are to be produced. Thus, for a sheet made of PETG, each milling tool revolves, for example, at a speed of 400 revolutions per minute for a milling tool diameter of 80 mm.

The sheet 4 is fixed to the holding means 5 of the device according to the invention. Then, the shaft or shafts 2 are made to rotate, rotationally driving the milling tool or tools 3. The sheet 4 is translated in the second direction in order to position it so that the milling tool or tools 3 are at the right point relative to the sheet 4 to produce the slots. Then, the sheet 4 is translated in the first direction (perpendicularly to the sheet), toward the slot or slots 3, until the milling tool or tools have passed through the thickness of the sheet 4 and at least a portion of that of the panel 5 (working position), then the sheet 4 is translated in the second direction (parallel to the sheet) until the length of the slot is as desired. Then, the sheet 4 is once again translated in the first direction to move it away from the milling tool or tools 3. In the case where the device comprises only a single shaft 2, the sheet 4 is then translated in the second direction to position it so that the milling tool or tools 3 are positioned at an appropriate second point relative to the sheet 4 to produce other slots. And so on.

Each milling tool may form a single slot or several slots. Preferably, all the slots of a sheet 4 are of the same width and of the same length, without this being limiting. If the device according to the invention comprises a single shaft 2, each milling tool 3 will form a number of slots. If the device according to the invention comprises a number of shafts 2, each milling tool 3 may form only a single slot. Thus, the sheet can be positioned so that each milling tool 3 is facing a single point of the sheet to form a single slot. The set of slots of the sheet 4 is then produced simultaneously, which makes it possible to manufacture an acoustic absorbent panel very rapidly, for example in 10 seconds. Equally, the sheet may be positioned so that each milling tool 3 is facing a first point on the sheet 4 to form a first slot, then, once the first slot is formed, the sheet is moved away from the milling tool to be positioned so that the milling tool is facing a second point of the sheet so as to form a second slot, and so on until the necessary number of slots has been formed.

During the slot formation step, the slots are formed parallel to one another, aligned or staggered, depending on the arrangement of the milling tools which are themselves aligned or staggered on the different shafts 2 of the device according to the invention.

The method according to the invention makes it possible to produce a plurality of slots parallel to one direction and a plurality of slots parallel to another direction, these two directions preferably being perpendicular to one another. In fact, the method according to the invention can be used a first time to produce a first set of slots parallel to one another, then a second time, by rotating the sheet by 90° for example between the first and the second uses, to produce a second set of slots which are then perpendicular to the slots of the first set of slots. Thus, it is possible to obtain an acoustic absorbent panel with cross-shaped slots. As a variant, chevron-shaped slots can be produced.

During the rotation of the milling tools, and in particular during the milling of the slots, each milling tool is sprayed with two jets of water to cool and clean the milling tool, as explained above for the device.

Before the slot formation step, the method may comprise a step for decorating the sheet with water-resistant ink, paint or varnish then/or a step for coating the sheet with a scratch-proof varnish. The scratch-proof varnish is, for example, the product Lipa marketed by the company Zweko bvba.

The invention also relates to the use of the appliance according to the invention to manufacture, according to the method according to the invention, an acoustic absorbent panel made of polyethylene terephthalate glycol or of polyethylene terephthalate or of polycarbonate or of polymethyl methacrylate, provided with a plurality of slots with a width of between 0.2 and 0.4 mm with a percentage surface area of slots relative to the total surface area of the panel of between 1.5 and 5%.

The expression "acoustic absorbent panel" is used to mean a sheet 4 provided with slots as described above. The panel 5 is simply a means for holding the sheet while the slots are being produced, but is not a part of the acoustic absorbent panel consisting of the sheet 4 provided with the slots.

The invention also relates to an acoustic absorbent panel made of polyethylene terephthalate glycol or of polyethylene terephthalate or of polycarbonate or of polymethyl methacrylate, provided with a plurality of slots with a width of between 0.2 and 0.4 mm, with a percentage surface area of slots relative to the total surface area of the panel of between 1.5 and 5%. The acoustic absorbent panel is manufactured according to the method of the invention, by means of the device according to the invention. The acoustic absorbent panel may constitute, or form part of, a partition or a ceiling, for example by being fixed to a partition or to a ceiling in order to acoustically insulate a room, this fixing being able to be done with or without spacing between the acoustic absorbent panel and the partition or the ceiling. The acoustic absorbent panel consists, for example, of a 1 m² square sheet, having 1000 slots 10 cm long and 0.2 mm wide, with 10 mm between two rows of slots and 9.8 mm between two slots of one and the same row. A plurality of panels of this type will have to be placed side by side with one another in order to form an acoustically insulating partition or ceiling or even in order to insulate a room by fixing to an existing partition or ceiling.

The invention thus makes it possible to manufacture an acoustic absorbent panel quickly and inexpensively, with a device that is simple and quick to use, to produce an acoustically efficient panel which is also cheap.

The invention claimed is:

1. A method for manufacturing an acoustic absorbent panel, the method comprising:
    milling, with a milling tool, a plurality of through-slots in a sheet comprising a plastic material,
wherein
    the plastic material comprises at least one of a linear thermoplastic polyester, polyethylene terephthalate (PET), polycarbonate (PC) and polymethyl methacrylate (PMMA),
    the plurality of through-slots have a width between 0.2 and 0.4 mm, and
    the percentage surface area of the through-slots relative to the total surface area of the panel is from 1.5 to 5%,
    and wherein, during the milling, the sheet is positioned such that the milling tool faces a first point on the sheet, to form a first slot; and then,
    the sheet is moved away from the milling tool and repositioned such that the milling tool faces at least one second point on the sheet, to form at least one second slot.

2. The method of claim 1, wherein the milling is carried out with a plurality of milling tools.

3. The method of claim 1, wherein, during the milling, the milling tool is sprayed with water, thereby cooling and cleaning the milling tool.

4. The method of claim 1, wherein the slots are formed parallel to one another, on one and the same line or staggered.

5. The method of claim 1, wherein a plurality of slots are formed parallel to a first direction, then a plurality of slots are formed parallel to a second direction, which is different from the first direction.

6. The method of claim 1, further comprising, before the milling:
    decorating the sheet with a water-resistant ink, paint, or varnish; then/or
    coating the sheet with a scratch-proof varnish.

7. The method of claim 1, wherein the plastic material comprises a linear thermoplastic polyester.

8. The method of claim 1, wherein the plastic material comprises a polyethylene terephthalate (PET).

9. The method of claim 1, wherein the plastic material comprises a polycarbonate (PC).

10. The method of claim 1, wherein the plastic material comprises a polymethyl methacrylate (PMMA).

11. The method of claim 1, wherein the plastic material comprises a polyethylene terephthalate glycol.

12. The method of claim 1, wherein the sheet has a thickness of between 4 and 5 mm.

* * * * *